United States Patent [19]
Corlet

[11] 3,777,789
[45] Dec. 11, 1973

[54] DEVICE FOR CONNECTING A DISPENSING COUPLER TO A CONTAINER FOR FLUID UNDER PRESSURE

[75] Inventor: Gabriel Corlet, Pierre-Benite, France
[73] Assignee: Application Des Gaz, Paris, France
[22] Filed: Jan. 11, 1972
[21] Appl. No.: 217,028

[30] Foreign Application Priority Data
Jan. 18, 1971 France..........................7102413

[52] U.S. Cl............... 141/329, 141/384, 141/386, 285/320
[51] Int. Cl........................... B65b 3/04, B67c 3/24
[58] Field of Search ................... 141/7, 17, 19, 65, 141/329, 330, 346, 383, 384, 385, 386, 387; 285/320, 401; 292/34

[56] References Cited
UNITED STATES PATENTS
2,962,307  11/1960  Nebinger ........................ 141/330 X
3,558,010  1/1971  Zenger et al..................... 141/19 X Primary Examiner—Harvey C. Hornsby
Assistant Examiner—G. R. Robinson
Attorney—Arthur E. Dowell, Jr. et al.

[57] ABSTRACT

A device to connect a coupling for a dispensing device to a container of fluid under pressure, of the type comprising a plate which is formed at the edge with clips capable of being engaged from one side of the container around a rim surrounding the end wall, the plate having a tapped hole into which the coupling can be screwed, causing it to bear against the wall of the container to drive in a needle or rod capable of puncturing the wall or of opening the member of a holding valve which is provided thereon, so as to establish free communication between the coupling and the interior of the container, wherein a movable element having at least one coacting clip capable of being engaged around the rolled rim is provided, the coupling when it is screwed into the plate, being arranged to cause the clip of the movable element to be locked in its engaged position around the rolled rim.

10 Claims, 8 Drawing Figures

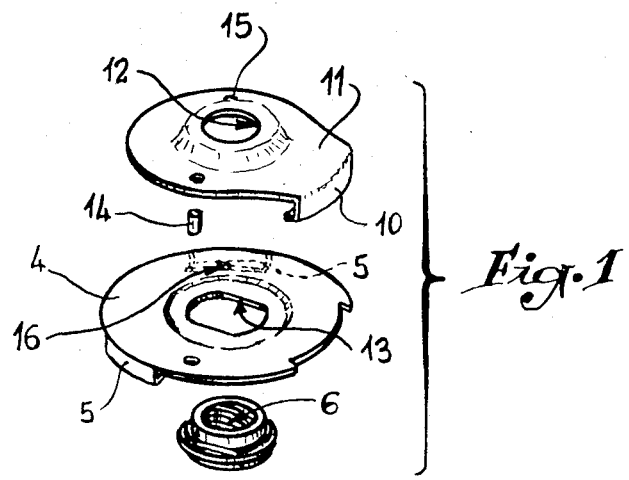
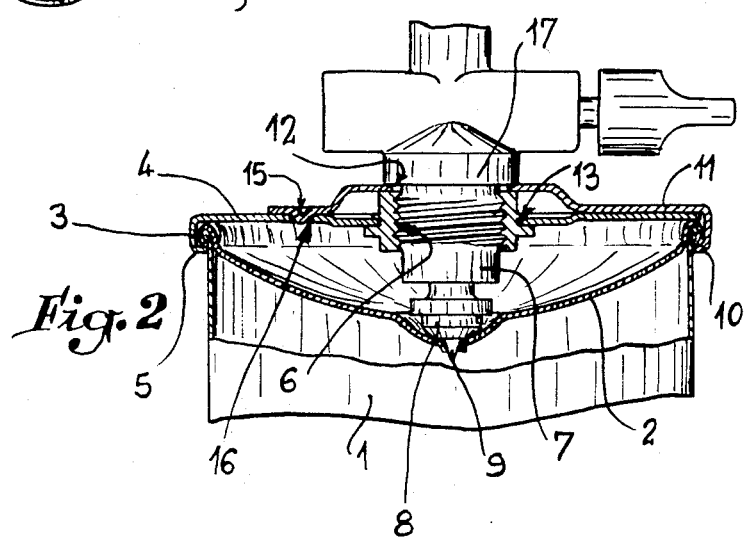
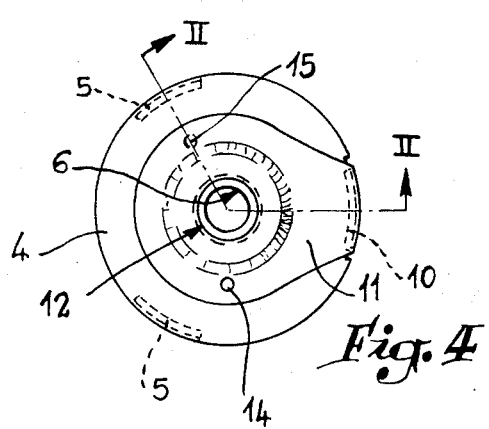
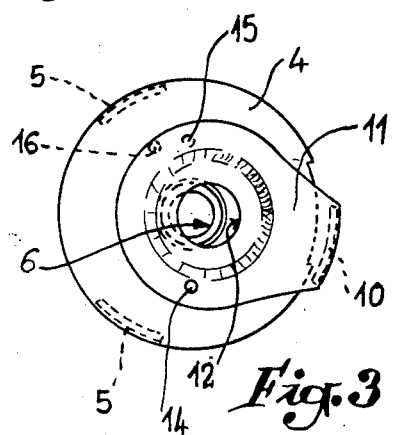

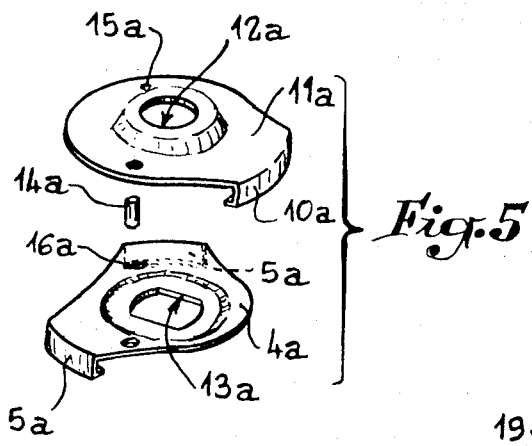
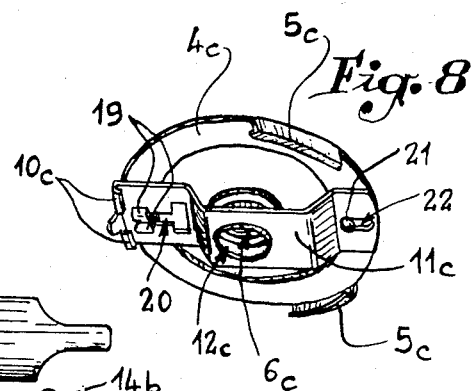
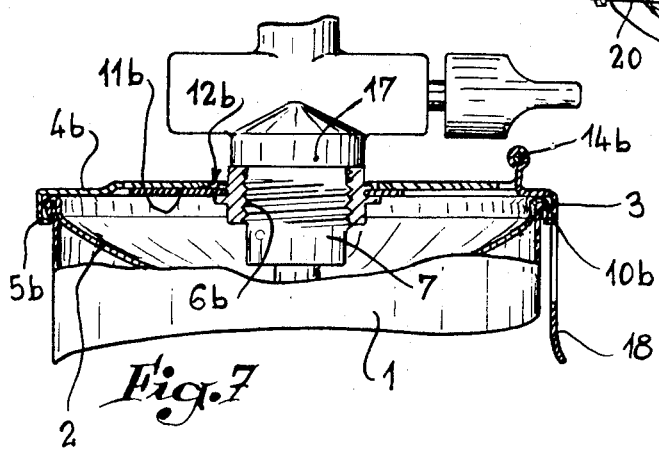
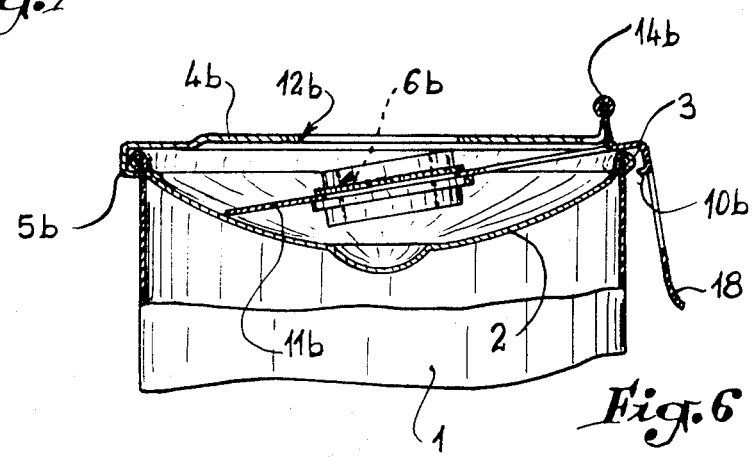

DEVICE FOR CONNECTING A DISPENSING COUPLER TO A CONTAINER FOR FLUID UNDER PRESSURE

The invention relates to a device by which a coupling for a discharge connection can be connected on the rolled rim of a container for fluid under pressure, particularly a container holding a liquefied combustible gas.

Such a device may be of the type comprising a plate which is provided on its edge with clip(s) capable of being connected from one side of the container around this rim, and through which extends a tapped hole into which the coupling can be screwed, causing it to bear against the wall of the container preferably through an annular seal and causing it to drive in axially through the seal, a neddle capable of perforating the wall, or to open a valve in the wall so as to establish free communication between the coupling and the interior of the container.

With devices of this type, it is important that once communication has been established between the coupling and the container, the device may no longer be detached from the container, so as to avoid the danger which could result for the person using it, especially in the case where the container holds a liquefied combustible gas under pressure, which would then escape freely into the atmosphere, with the risk of causing a fire or even an explosion.

Such a device according to the invention is characterised in that it comprises a movable element provided with at least one clip which is suitable for connection to the rolled rim of the container and in that the coupling, once it is screwed into the plate becomes locked against the latter, in its connected position around the aforesaid rolled rim.

The movable element is advantageously formed by a counter-plate through which extends a hole which, when brought into coincidence with the hole of the main plate and traversed with this latter by the threaded coupling, locks the coacting clip of the counter-plate in relation to the clips of the plate in the position in which they are engaged on the rolled rim of the container.

Preferably, only the hole of the plate (the terms "plate" and "counter-plate" must be considered as being interchangeable) which has to be sandwiched between the other plate and the container, is tapped for receiving the threaded coupling, while the hole of the other is smooth for providing free passage to the coupling.

According to one advantageous embodiment, the plate and the counter-plate are pivotted to one another so as to form with their clips a gripping device capable of being held locked around the rolled rim of the container by the screwing of the coupling into the plate.

The pivot pin which connects the counter-plate to the plate is preferably perpendicular to their plane of contact and eccentric with respect to the holes extending through them. It is then expedient for the plate and the counter-plate to comprise at least one projection and at least a complementary centering recess which enter one within the other when their holes coincide for receiving the coupling.

According to another embodiment, the pivot pin which connects the plate to the counter-plate is parallel to the plane of contact of these elements. It is then advantageous to shift the pivot axis out of the aforesaid plane, from the side opposite to that intended to be placed on the rolled rim of the container, to position it close to this rim and to arrange it parallel to its tangent.

According to yet another embodiment of the invention, the plate and the counter-plate are guided one upon the other, by sliding in the direction of a diameter common to the holes extending through them.

A preferred embodiment of the invention will now be described by way of example with reference to the accompanying drawings in which:

FIG. 1 is an exploded perspective view of the various parts which form a device constructed in accordance with a first embodiment of the invention;

FIG. 2 is a section along the line II—II (FIG. 4) of the same device connected to the rolled rim of a container of fluid under pressure and locked by means of a coupling for the withdrawal of the contents of this container.

FIGS. 3 and 4 show in plan view the same device, respectively before and after connection;

FIG. 5 shows, similarly to FIG. 1, certain component parts of a device constructed according to a modification;

FIG. 6 is an axial section of a device constructed in accordance with another embodiment of the invention, during connection to a container of fluid under pressure;

FIG. 7 is an axial section of the device in FIG. 6, in its locked position on the container by means of a withdrawal coupling;

FIG. 8 is a perspective view of a device constructed according to yet another embodiment of the invention.

It is known that industrial firms frequently deliver to their customers products under pressure which are stored in containers which, for economic reasons, are made of relatively thin sheet metal, something like certain preserve cans, comprising a cylindrical wall 1 which is closed at its two ends by walls 2 which are curved inwardly in dished form towards the axis of the cylinder 1 and united in fluid-tight manner with the rims of the latter by beading, so that a rolled rim 3 projecting over the periphery of the cylinder 1 is formed at each of the ends of the latter.

It will be noted that the containers of the type in question can contain aerosols for various uses or even a liquefied combustible gas under pressure, such as butane gas, capable of being used particularly in portable equipment for lighting, cooking or heating purposes.

So as to be able to draw off the contents of the container, it is necessary to connect to it a coupling which must establish a tight connection. It would of course be possible to provide one of the coupling elements on the container itself, but this would increase the cost of manufacture of the container. It is more advantageous to establish this coupling element in the form of a device independent of the container, which device can be removably connected on the rim 3.

The device shown in FIGS. 1–4 comprises a main plate 4 which is provided at its edge with clips 5 capable of being connected, from one side of the container, around its rim 3, and which is provided with a tapped apertured member 6, into which a withdrawal coupling 7 can be screwed, causing it to bear against the wall 2 of the container through an annular seal 8 and causing it to drive in, through the seal, a needle 9 capable of puncturing the wall, so as to establish free communication between the coupling and the interior of the container.

It will be appreciated that it is important to provide means capable of preventing the plate 4 from being able inopportunely to become disconnected from the rim 3, as long as the container still holds pressurised fluid.

For this purpose, the plate 4 has associated therewith a movable element comprising at least one coacting clip 10 capable of being connected, from the opposite side of the container, around the rolled rim 3, and the coupling 7, when it is screwed into the plate 4, becomes locked to the plate in its connected position around the rolled rim 3.

In the embodiment illustrated in FIGS. 1 and 4, the movable element is formed by a counter-plate 11 which also has a hole 12 extending therethrough, and this hole, when it is brought into coincidence with the hole 6 and when both holes receive the threaded coupling 7, locks the coacting clip 10 in relation to the clips 5 of the plate 4 in its position in which it is connected around the rolled rim 3 of the container.

The tapped hole 6 may be that of a neck-like element connected to the plate 4, for example by crimping, in a non-circular opening 13.

It will be noted that the tapped hole 6 is in the plate 4 which is sandwiched between the counter-plate 11 and the container, while the hole 12 formed in the counter-plate 11 is smooth for providing free passage to the coupling 7. The plate 4 and the counter-plate 11 are pivotted on one another by a pin 14 which is perpendicular to their plane of contact and which is eccentric with respect to the holes 6 and 12 extending through the plates, so as to form with their clips 5 and 10, respectively, a gripping device capable of being tightened around the rolled rim 3 of the container by simply screwing the coupling 7 into the tapped hole 6.

It is advantageous to provide additional means in the plate 4 and the counter-plate 11 in one, the counter-plate 11 in the present instance, there is provided at least one projection 15 in the form of a downwardly directed boss, and in the other, the plate 4 in the present instance, there is formed at least one recess in the form of a hole 16, the projection and hole being complementary, so as to be able to ensure a strict automatic centering of the hole 12 on the hole 6 when they enter one another and thus to avoid the play liable to exist between the rim of the hole 12 and the union 7 with a threaded base being able to permit the clips 5 from becoming loosened beneath the rim 3 of the container.

For positioning the connection device on the container, the counter-plate 11 is caused to pivot, as shown in FIG. 3, on the plate 4 about the pivot pin 14 in a clockwise direction, so as to space the coacting clip 10 from the periphery of the plate 4, this permitting the clips 5 of the latter to be engaged beneath the rim 3 of the container, whereafter the counter-plate 11 is caused to pivot in the reverse direction about the pivot pin 14, until the coacting clip 10 is applied from the opposite side beneath the rim 3 of the container.

The device is then in the position shown in FIG. 4, in which the holes 6 and 12 coincide. The coupling 7 can then be screwed into position in the hole 6. By this screwing action, a shoulder 17 of the coupling bears against the counter-plate 11 along the rim of the hole 12, causing the counter-plate tightly to grip against the plate 4, while causing the centering projection 15 to enter the corresponding hole 16.

The assembly is then in the position shown in FIG. 2, in which all movement of the counter-plate 11 relatively to the plate 4 is prevented by the coupling 7.

The device shown in FIG. 5 differs from that which has just been described simply by the fact that the plate 4a has been cut away at its periphery to reduce the material required for its manufacture, making it lighter and less costly and making it possible to see, between the rim 3 of the container and the device, how the coupling 7 is bearing with its annular joint 8 against the central part of the wall 2 of the container.

In both cases, it is expedient to form the clip or clips 5 or 5a provided on the plate and the coacting clip 10 or 10a provided on the counter-plate, in the form of flanged rims capable of enclosing over a considerable length one of the opposite halves of the rolled rim 3 of the container 1.

The embodiment which is shown in FIGS. 6 and 7 differs from the previously described embodiments by the fact that the pivot pin 14b which connects the plate 4b to the counter-plate 11b extends parallel to their plane of contact. This pin 14b is advantageously moved out of this plane of contact from the side opposite to that by which the device should co-operate with the rolled rim 3 of the container and extends as close as possible to this rim parallel to its tangent.

It is seen in FIG. 6 that, by forming a slight gap between the gripping arms formed by the plate 4b and the counter-plate 11b, it is possible to engage the clips 5b of the plate 4b around the rim 3, cause the coacting clip 10b of the counter-plate 11b to pass around the same rim 3, on the opposite side of the container, and to engage it beneath the said rim by lifting the counter-plate 11b against the plate 4b. This lifting action of the plate 11b can be facilitated by a tongue 18 which is an extension of the coacting clip 10b, perpendicular to the counter-plate 11b, and which can be easily pushed against the cylindrical wall 1 of the container. It is seen from the embodiment according to FIGS. 6 and 7 that the tapped hole 6b is formed in the counter-plate 11b, as it is this latter which has to be sandwiched between the container and the plate 4b.

It is seen that when the coupling 7 is screwed into the hole 6b of the counter-plate 11b, the clips 5b and the coacting clip 10b are locked without any play beneath the device, which offers a solid supporting base to the coupling 7, permitting it to be pressed with force against the wall 2 of the container.

Instead of connecting the plate and the counter-plate by a pivot 14, 14b, it is also possible, as shown in the embodiment of the invention illustrated in FIG. 8, to connect them to one another by means which permit them to slide one upon the other in the direction of a diameter common to the holes 6c and 12c extending through them.

According to the embodiment shown in FIG. 8, in which the plate 4c carries two clips 5c and the counter-plate 11c carries two coacting clips 10c, the sliding means are arranged on the common axis of symmetry of the plate and counter-plate. They can be formed on one side by two small tongues 19 cut in the plate 4c, passed through a slot 20 of the counter-plate 11c and bent back on this latter and, from the other side, by a rivet 21 which is fixed in the plate 4c and which extends with a certain play through the slot 22 of the counter-plate 11c. The slots 20 and 22 of the counter-plate 11c extend along the axis of symmetry common to the plate 4c and to the counter-plate 11c.

It is apparent that, with the arrangement shown in FIG. 8, it is possible to space the coacting clips 10c from the clips 5c by pulling the counter-plate 11c beneath the plate 4c until the small tongues 19 and the rivet 21 abut against the opposite ends of their slots 20 and 22, respectively. It is then easy to attach the plate 4c by its clips 5c around the rolled rim 3 of a container, such as shown in FIGS. 2, 6 or 7, and then to push the counter-plate 11c beneath the plate 4c for engaging its coacting clips 10c beneath the opposite side of the rolled rim 3. When the coacting clips 10c are fully engaged beneath the rolled rim 3 of the container, the hole 12c of the counter-plate 11c must be exactly in alignment with the threaded hole 6c of the plate 4c, so that by screwing the coupling 7 into this latter, the non-threaded end of the coupling will penetrate into the smooth hole 12c, thereby locking the counter-plate 11c beneath the plate 4c.

As a consequence, and regardless of which embodiment has been adopted, there is obtained a connecting or attachment device for a coupling for a dispensing device on a container of fluid under pressure, which remains perfectly locked on this container as long as this coupling is left screwed into the device.

It will be observed that the container, instead of itself being pierced by the point 9 of the coupling, may comprise a valve-type closure device at the centre of the wall 2, axially of the hole 6 or coupling 7, such as the device described in French Patent 1,601,667. Such an arrangement avoids all conseuqnences to the user of an incorrect operation, which would consist for example of unscrewing the coupling 7 before the container is completely empty, since the valve would then automatically close the coupling orifice and would avoid the escape of the fluid under pressure which, particularly when it is formed by a liquefied combustible gas, could cause a fire or even an explosion.

What we claim is:

1. A device to connect a coupling for a dispensing device to a container of fluid under pressure, of the type comprising a plate which is formed at the edge with clips capable of being engaged from one side of the container around a rim surrounding the end wall, the plate having a tapped hole into which the coupling can be screwed, causing it to bear against the wall of the container to drive in a needle or rod capable of puncturing the wall or of opening the member of a holding valve which is provided thereon, so as to establish free communication between the coupling and the interior of the container, wherein a movable element having at least one coacting clip capable of being engaged around the rolled rim is provided, the coupling when it is screwed into the plate, being arranged to cause the clip of the movable element to be locked in its engaged position around the rolled rim.

2. A device according to claim 1, characterised in that the clip or clips provided on the plate, and the coacting clip or clips provided on the counter-plate, are formed by flanged rims capable of enclosing over a significant length one of the opposite halves of the rolled rim of the container.

3. A device according to claim 1, characterised in that the movable element is formed by a counter-plate having a hole which, when it is brought into coincidence with the hole of the main plate and when the threaded coupling passes through the holes, locks the coacting clips of the counter-plate relatively to the clips of the main plate in their position in which they are engaged on the rolled rim of the container.

4. A device according to claim 3, characterised in that the plate and the counter-plate are arranged to slide one upon the other in the direction of a diameter common to the holes extending through them.

5. A device according to claim 3, characterised in that only the hole of the plate or counter-plate which has to be sandwiched between the other plate respectively and the container is tapped to receive the threaded coupling, while the other hole is smooth to provide free passage to the said coupling.

6. A device according to either of claim 3, characterised in that the plate and the counter-plate are pivotted to one another so as to form, with their clips and coacting clips a gripping device capable of being held locked around the rolled rim of the container or screwing the coupling into the plate.

7. A device according to claim 6, characterised in that the pivot pin which connects the counter-plate to the plate is perpendicular to the plane of the plates and is eccentric relatively to the holes which extend through them.

8. A device according to claim 7, characterised in that the plate and the counter-plate are provided, with at least one projection and at least one complementary centering recess respectively, which enter one another when their holes for receiving the coupling, coincide.

9. A deivce according to claim 6, characterised in that the pivot pin which connects the plate with counter-plate is parallel to the plane of contact of the plates.

10. A device according to claim 9, characterised in that the pivot pin is moved outside the plane of contact of the plate with the counter-plate on the side opposite to that on which the device cooperates with the rim of the container and extends parallel to its tangent with the rim.

* * * * *